US008547568B2

(12) United States Patent
Wang et al.

(10) Patent No.: US 8,547,568 B2
(45) Date of Patent: *Oct. 1, 2013

(54) APPROACH FOR SECURELY PRINTING ELECTRONIC DOCUMENTS

(75) Inventors: Sam Wang, San Jose, CA (US); Seiichi Katano, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 153 days.

This patent is subject to a terminal disclaimer.

(21) Appl. No.: 13/230,541

(22) Filed: Sep. 12, 2011

(65) Prior Publication Data
US 2012/0002234 A1    Jan. 5, 2012

Related U.S. Application Data

(63) Continuation of application No. 11/148,864, filed on Jun. 8, 2005, now Pat. No. 8,031,348.

(51) Int. Cl.
*G06K 15/00*    (2006.01)

(52) U.S. Cl.
USPC ............ 358/1.14; 358/1.15; 358/1.16; 726/5; 713/165; 713/168; 380/55

(58) Field of Classification Search
USPC ...................................... 380/55, 51
See application file for complete search history.

(56) References Cited

U.S. PATENT DOCUMENTS

| | | | | |
|---|---|---|---|---|
| 5,633,932 A | * | 5/1997 | Davis et al. | 713/176 |
| 5,845,066 A | * | 12/1998 | Fukuzumi | 726/19 |
| 5,880,447 A | * | 3/1999 | Okada et al. | 235/380 |
| 5,970,218 A | | 10/1999 | Mullin et al. | |
| 6,161,139 A | | 12/2000 | Win et al. | |
| 6,735,665 B1 | * | 5/2004 | Kumagai et al. | 711/101 |
| 6,862,583 B1 | | 3/2005 | Mazzagatte et al. | |
| 6,973,671 B1 | * | 12/2005 | Hsing et al. | 726/8 |
| 7,002,703 B2 | * | 2/2006 | Parry | 358/1.15 |
| 7,170,623 B2 | * | 1/2007 | Matoba et al. | 358/1.15 |
| 7,224,477 B2 | * | 5/2007 | Gassho et al. | 358/1.14 |
| 7,359,076 B2 | * | 4/2008 | Uchino | 358/1.15 |
| 7,450,260 B2 | * | 11/2008 | Takeda et al. | 358/1.15 |
| 7,667,865 B2 | | 2/2010 | Ciriza et al. | |

(Continued)

FOREIGN PATENT DOCUMENTS

| | | |
|---|---|---|
| EP | 0 657 845 A2 | 11/1994 |
| EP | 1 566 719 A2 | 2/2005 |

(Continued)

OTHER PUBLICATIONS

European Patent Office, "European Search Report", in application No. 09164263.7, dated May 4, 2012, 6 pages.

*Primary Examiner* — Twyler Haskins
*Assistant Examiner* — Nicholas Pachol
(74) *Attorney, Agent, or Firm* — Hickman Palermo Truong Becker Bingham Wong LLP; Edward A. Becker

(57) ABSTRACT

An approach is provided for securely printing electronic documents using a portable media. The approach is applicable to a wide variety of contexts and implementations and includes secure direct printing of electronic documents, secure direct printing of electronic documents with remote user authentication and secure printing of electronic documents with remote data management. The particular information provided on the portable media varies, depending upon the implementation. Furthermore, the approach provides varying degrees of security and may be used in conjunction with conventional printing of electronic documents.

18 Claims, 8 Drawing Sheets

(56) References Cited

U.S. PATENT DOCUMENTS

| | | |
|---|---|---|
| 7,797,328 B2 | 9/2010 | Styles |
| 8,363,243 B2 | 1/2013 | Nuggehalli |
| 2001/0038462 A1* | 11/2001 | Teeuwen et al. ............. 358/1.15 |
| 2002/0002503 A1* | 1/2002 | Matsuoka ....................... 705/26 |
| 2002/0021902 A1* | 2/2002 | Hosoda et al. ................ 396/429 |
| 2002/0023143 A1* | 2/2002 | Stephenson et al. .......... 709/218 |
| 2002/0059322 A1* | 5/2002 | Miyazaki et al. ............. 707/200 |
| 2002/0120855 A1* | 8/2002 | Wiley et al. ................... 713/189 |
| 2003/0044009 A1* | 3/2003 | Dathathraya ................... 380/55 |
| 2003/0090696 A1* | 5/2003 | Willis et al. .................. 358/1.14 |
| 2003/0090967 A1* | 5/2003 | Mizuno ....................... 369/30.94 |
| 2004/0056889 A1* | 3/2004 | Katano ........................... 345/741 |
| 2004/0088378 A1* | 5/2004 | Moats ............................ 709/219 |
| 2004/0090652 A1* | 5/2004 | Yoon ............................. 358/1.16 |
| 2004/0095595 A1 | 5/2004 | Jacobsen |
| 2004/0118911 A1 | 6/2004 | Black et al. |
| 2004/0125402 A1* | 7/2004 | Kanai et al. ................... 358/1.15 |
| 2004/0140611 A1 | 7/2004 | Mui et al. |
| 2004/0156068 A1 | 8/2004 | Yoshida et al. |
| 2004/0159783 A1 | 8/2004 | Gavin et al. |
| 2004/0196492 A1 | 10/2004 | Johnson et al. |
| 2004/0257601 A1* | 12/2004 | Tomiyasu et al. .............. 358/1.9 |
| 2004/0263870 A1 | 12/2004 | Itoh et al. |
| 2005/0039044 A1* | 2/2005 | Gassho et al. ................ 713/201 |
| 2005/0046876 A1* | 3/2005 | Burget et al. ................. 358/1.15 |
| 2005/0068547 A1* | 3/2005 | Negishi et al. ............... 358/1.15 |
| 2005/0094195 A1* | 5/2005 | Sakamoto et al. ........... 358/1.15 |
| 2005/0141013 A1* | 6/2005 | Kikuchi et al. .............. 358/1.15 |
| 2005/0149755 A1* | 7/2005 | Shima et al. ................. 713/201 |
| 2005/0152543 A1* | 7/2005 | Shima et al. ................... 380/51 |
| 2005/0154884 A1* | 7/2005 | Van Den Tillaart ........... 713/165 |
| 2005/0168769 A1* | 8/2005 | Kim et al. .................... 358/1.14 |
| 2005/0182508 A1* | 8/2005 | Niimi et al. .................... 700/138 |
| 2005/0182822 A1* | 8/2005 | Daniel et al. ................. 709/213 |
| 2005/0183141 A1 | 8/2005 | Sawada |
| 2005/0210253 A1* | 9/2005 | Shigeeda ....................... 713/171 |
| 2005/0213136 A1* | 9/2005 | Noyama et al. ............. 358/1.14 |
| 2005/0229189 A1 | 10/2005 | McManus |
| 2005/0268089 A1* | 12/2005 | Kim et al. ..................... 713/153 |
| 2005/0273843 A1* | 12/2005 | Shigeeda ......................... 726/5 |
| 2005/0273852 A1* | 12/2005 | Ferlitsch ......................... 726/17 |
| 2005/0276618 A1* | 12/2005 | Clement et al. ................ 399/24 |
| 2006/0044589 A1* | 3/2006 | Nakagawaji .................. 358/1.14 |
| 2006/0112270 A1* | 5/2006 | Erez .............................. 713/168 |
| 2006/0268315 A1* | 11/2006 | Randt ........................... 358/1.15 |
| 2006/0279760 A1* | 12/2006 | Wang et al. .................. 358/1.14 |
| 2006/0279761 A1* | 12/2006 | Wang et al. .................. 358/1.15 |
| 2006/0279768 A1* | 12/2006 | Wang et al. .................. 358/1.15 |
| 2008/0114922 A1* | 5/2008 | Chou et al. .................... 711/103 |
| 2008/0117452 A1 | 5/2008 | Murakami |
| 2008/0201784 A1* | 8/2008 | Someshwar ................. 358/1.15 |
| 2009/0185223 A1* | 7/2009 | Kanai et al. .................. 358/1.15 |
| 2009/0316183 A1* | 12/2009 | Wei .............................. 358/1.15 |
| 2010/0002249 A1* | 1/2010 | Nuggehalli et al. ......... 358/1.14 |
| 2011/0013219 A1 | 1/2011 | Nuggehalli et al. |
| 2012/0140264 A1 | 6/2012 | Nuggehalli |
| 2013/0083363 A1 | 4/2013 | Kim |
| 2013/0169991 A1 | 7/2013 | Nuggehalli |

FOREIGN PATENT DOCUMENTS

| | | |
|---|---|---|
| JE | 2004181647 A | 7/2004 |
| JP | 4235667 A | 8/1992 |
| JP | 6152814 A | 5/1994 |
| JP | 10207660 A | 8/1998 |
| JP | 2001067201 A | 3/2001 |
| JP | 2002175241 A | 6/2002 |
| JP | 2002199153 A | 7/2002 |
| JP | 2005074772 A | 3/2005 |
| JP | 2005178070 A | 7/2005 |
| JP | 2005196741 A | 7/2005 |
| JP | 2006205374 A | 8/2006 |
| JP | 2006231675 A | 9/2006 |
| JP | 2006252142 A | 9/2006 |
| JP | 2007055022 A | 3/2007 |
| JP | 2007203736 A | 8/2007 |
| JP | 2007290396 A | 11/2007 |
| JP | 2008103867 A | 5/2008 |

* cited by examiner

APPROACH FOR SECURELY PRINTING ELECTRONIC DOCUMENTS

RELATED APPLICATIONS AND CLAIM OF PRIORITY

This application is a continuation application of and claims priority to U.S. patent application Ser. No. 11/148,864, filed Jun. 8, 2005, entitled "Approach for Securely Printing Electronic Documents", the entire contents of which is incorporated by reference in its entirety for all purposes as if fully set forth herein.

This application is related to U.S. patent application Ser. No. 11/148,678, filed Jun. 8, 2005, entitled "Approach For Securely Printing Electronic Documents", the entire disclosure of which is hereby incorporated by reference as if fully set forth herein.

This application is related to U.S. patent application Ser. No. 11/149,065, filed Jun. 8, 2005, entitled "Approach For Securely Printing Electronic Documents", the entire disclosure of which is hereby incorporated by reference as if fully set forth herein.

FIELD OF THE INVENTION

This invention relates generally to printing devices, and more specifically, to an approach for securely printing electronic documents.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The proliferation of computer technology and the growth of the Internet have greatly increased access to electronic information. One of the continuing issues is how to prevent unauthorized access to electronic documents that contain confidential or sensitive information. As a result, approaches have been developed to control access to electronic documents. For example, electronic documents are sometimes encrypted when being transmitted over public networks, such as the Internet. This makes it difficult, if not impossible, depending upon the encryption used, for an unauthorized party who intercepts an encrypted electronic document to recover the original electronic document. As another example, some organizations store electronic documents in secure locations, such as on a secure server. Access policies that indicate who has access to certain electronic documents may be used to control access to the electronic documents.

The concerns over unauthorized access to electronic documents that contain confidential or sensitive information also apply when electronic documents are being printed. Electronic documents are conventionally transmitted to printing devices in unencrypted form. Thus, an unauthorized party who can gain access to a communications link to a printing device can obtain electronic documents in unencrypted form. For example, an unauthorized party may eavesdrop on a wired communications link to gain access to electronic documents. Wireless networks are particularly vulnerable because an eavesdropper does not need physical access to a wired network and can instead eavesdrop remotely. Thus, a party can monitor wireless communications with a printing device and intercept electronic documents being transmitted to the printing device. In addition to intercepting electronic documents being transmitted to a printing device, unauthorized parties can acquire printed versions of electronic documents. For example, an unauthorized party may gain access to a printing device and removed a printed electronic document before the person who printed the electronic document. Based on the foregoing, there is a need for an approach for securely printing electronic documents that does not suffer from limitations of prior approaches.

SUMMARY

An approach is provided for securely printing electronic documents using a portable media. The approach is applicable to a wide variety of contexts and implementations and includes secure direct printing of electronic documents, secure direct printing of electronic documents with remote user authentication and secure printing of electronic documents with remote data management. The particular information provided on the portable media varies, depending upon the implementation. Furthermore, the approach provides varying degrees of security and may be used in conjunction with conventional printing of electronic documents.

According to one embodiment, a printing device includes a print process configured to cause an electronic document to be printed. The printing device is also configured to receive, from a server over a network, encrypted print data that corresponds to user information. The printing device is also configured to decrypt the encrypted print data using the user information. The printing device may include other elements, for example, a media interface and/or an input device.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. SECURE DIRECT PRINTING OF ELECTRONIC DOCUMENTS
  A. Architecture
  B. Functional Overview
  C. User Authentication
  D. Secure Direct Printing
  E. Operational Example
III. SECURE DIRECT PRINTING OF ELECTRONIC DOCUMENTS WITH REMOTE USER AUTHENTICATION
  A. Architecture
  B. Functional Overview
  C. User Authentication
  D. Operational Example
IV. SECURE DIRECT PRINTING OF ELECTRONIC DOCUMENTS WITH REMOTE DATA MANAGEMENT
  A. Architecture
  B. Functional Overview
  C. User Authentication
  D. Operational Example
V. IMPLEMENTATION MECHANISMS I. Overview An approach is provided for securely printing electronic documents using a portable media. The approach is applicable to a wide variety of contexts and implementations and includes secure direct printing of electronic documents, secure direct printing of electronic documents with remote user authentication and secure printing of electronic documents with remote data management. The particular information provided on the portable media varies, depending upon the implementation. Furthermore, the approach provides varying degrees of security and may be used in conjunction with conventional printing of electronic documents.

II. Secure Direct Printing of Electronic Documents

The secure direct printing approach generally involves using a portable media to provide encrypted print data to a printing device. The encrypted print data is processed by the printing device after a user is successfully authenticated.

A. Architecture

Figure 1:
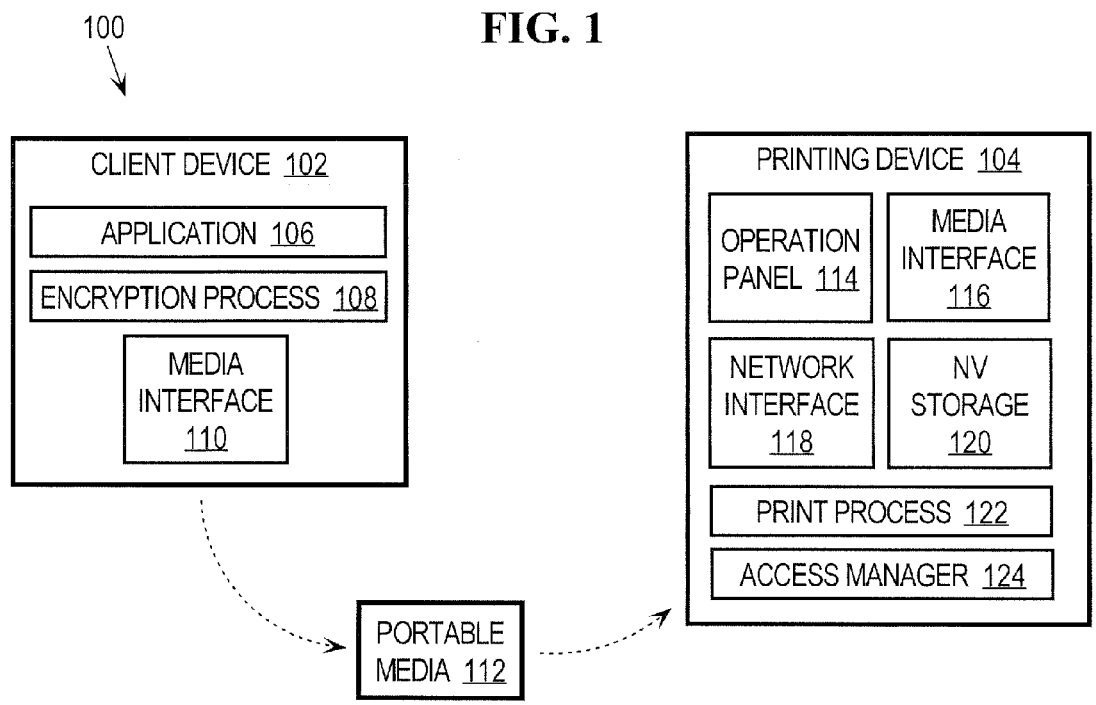
FIG. 1 is a block diagram that depicts an arrangement for secure direct printing of electronic documents.

FIG. 1 is a block diagram that depicts an arrangement 100 for secure direct printing of electronic documents. Arrangement 100 includes a client device 102 and a printing device 104 that may or may not, be communicatively coupled. For example, client device 102 may be communicatively coupled via a communications link. Furthermore, client device 102 and printing device 104 may be communicatively coupled to other devices and elements not depicted in FIG. 1.

Client device 102 may be any type of client device. Examples of client device 102 include, without limitation, a workstation, a personal computer, a Personal Digital Assistant (PDA), any type of mobile device and a cellular telephone. Client device 102 is configured with an application 106, an encryption process 108 and a media interface 110. Application 106 may be any process capable of generating print data. Examples of application 106 include, without limitation, a word processor, a spreadsheet program, an email client, a generic Web browser, a photo management program and a drawing or computer-aided design (CAD) program. Encryption process 108 is a process configured to encrypt print data generated by application 106. Application 106 and encryption process 108 are depicted in FIG. 1 as separate elements for explanation purposes only and the functionality of encryption process 108 may be integrated into application 106. Media interface 110 is an interface mechanism that allows data to be read from and written to a portable media 112. Portable media 112 may be any type of storage media that is capable of storing data. Examples of portable media 112 include, without limitation, memory sticks, smart cards, flash memory cards, access cards, portable disk drives and any other type of non-volatile memory.

Printing device 104 may be any device capable of printing electronic documents. Examples of printing device 104 include, without limitation, a printer, a copier, a facsimile and a Multi-Function Peripheral (MFP). An MFP is a peripheral device that includes multiple functionality, such as printing, copying, scanning and facsimile. According to one embodiment, printing device 104 includes an operation panel 114, a media interface 116, a network interface 118, a Non-Volatile (NV) storage 120, a print process 122 and an access manager 124.

Operation panel 114 is a mechanism and/or process that provides for the exchange of information between printing device 104 and a user. For example, operation panel 114 may include a display for conveying information to a user and a touchpad, buttons, or touch screen for receiving user input. Media interface 116 is an interface mechanism that allows data to be read from and written to portable media 112. For example, media interfaces 110, 116 may be implemented as a receptacle or slot configured to receive portable media 112. The receptacle or slot includes electrical contacts that make contact with electrical contacts on portable media 112 when portable media 112 is inserted into the receptacle or slot. Many different configurations are possible and this is but one example.

Network interface 118 is an interface that allows data to be exchanged between printing device 104 and other devices or elements. Examples of network interface 118 include, without limitation, a wired interface, such as an Ethernet card, and a wireless interface, such as an 802.x card. NV storage 120 may be any type of non-volatile storage. Examples of NV storage 120 include, without limitation, non-volatile memory, such as a flash memory, an optical storage device, an electro-optical storage device and one or more hard disks. Print process 122 is a process configured to process print data and generate printed versions of electronic documents. Access manager 124 is a mechanism or process configured to control access to electronic documents as described in more detail hereinafter.

B. Functional Overview

Figure 2:
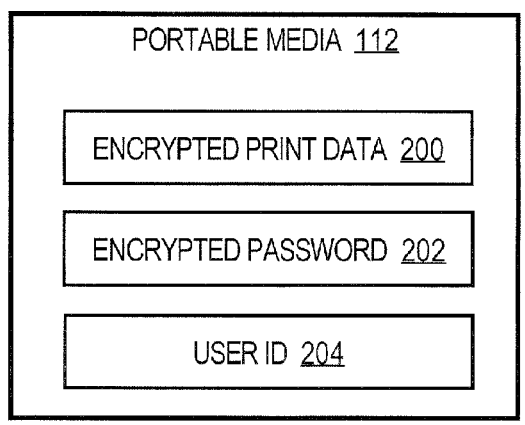
FIG. 2 is a block diagram that depicts example contents of a portable media, according to an embodiment.

According to the secure direct printing approach, client device 102 encrypts print data to generate encrypted print data. As depicted in FIG. 2, client device 102 stores the encrypted print data 200 on portable media 112. The portable media 112 is removed from client device 102 and inserted into printing device 104. Printing device 104 detects the presence of portable media 112 and retrieves the encrypted print data 200 from portable media 112. Printing device 104 authenticates a user and then decrypts the encrypted print data 200 to recover the original print data. Printing device 104 then processes the original print data to generate a printed version of the electronic document.

According to one embodiment, encrypted print data 200 is encrypted using a password. The password may be data of any type, characteristic or size. Printing device 104 uses the password to decrypt the encrypted print data 200 and recover the original print data. The password may be made available to printing device 104 in a variety of ways, depending upon the requirements of a particular implementation. According to one embodiment, client device 102 encrypts the password to generate an encrypted password 202 and stores the encrypted password 202 on portable media 112. Printing device 104 retrieves the encrypted password 202 from portable media 112 and decrypts the encrypted password 202 to recover the original password. Printing device 104 then uses the original password to decrypt the encrypted print data 200 retrieved from portable media 112.

Printing device 104 may also be configured to check any data read from portable media for any abnormalities. For example, printing device 104 may be configured to perform data integrity checking or virus checking on any data read from portable media 112. This reduces the likelihood of printing device 104 being accidentally infected by a virus.

C. User Authentication

User authentication is not required with the secure direct printing approach. This may be used when portable media are assigned to individual users and a high level of security is not required. For example, portable media 112, a user ID 204 and the password used to create an encrypted password 202 may be assigned to a particular user. The particular user generates an electronic document, for example using application 106. The electronic document is processed and print data generated. The print data is encrypted with the password to generate encrypted print data 200. The encrypted print data 200 is stored on portable media 112. Portable media 112 is removed from client device 102 and installed into printing device 104.

When printing device 104 detects the presence of portable media 112, access manager 124 reads encrypted print data 200, encrypted password 202 and user ID 204 from portable media 112 and stores them on NV storage 120. Access manager 124 decrypts encrypted password 202 to recover the original password. Access manager 124 uses the original password to decrypt encrypted print data 200 and recover the original print data. Access manager 124 then provides access to the electronic documents as described in more detail hereinafter. This approach is simple and does not require any user authentication. This approach has relatively low security however, because the security depends upon maintaining control over how encrypted password 202 is decrypted. A third party who obtains portable media 112 and is able to decrypt encrypted password 202 has the ability to access the electronic documents.

Different types of user authentication may be used, depending upon the requirements of a particular implementation, and the invention is not limited to any particular type of user authentication. According to one embodiment, a user is queried for a password via operation panel 114 on printing device 104. If the password entered by the user matches the original password recovered from encrypted password 202, then the user is successfully authenticated.

According to another embodiment, a user is queried for both a user identification (ID) and password via operation panel 114. The user ID may be data of any type, characteristic or size. If the user ID and password provided by the user correctly match user ID 204 stored on portable media 112 and the original password recovered from encrypted password 202, then the user is successfully authenticated. Access manager 124 may manage the user authentication process.

Figure 3:
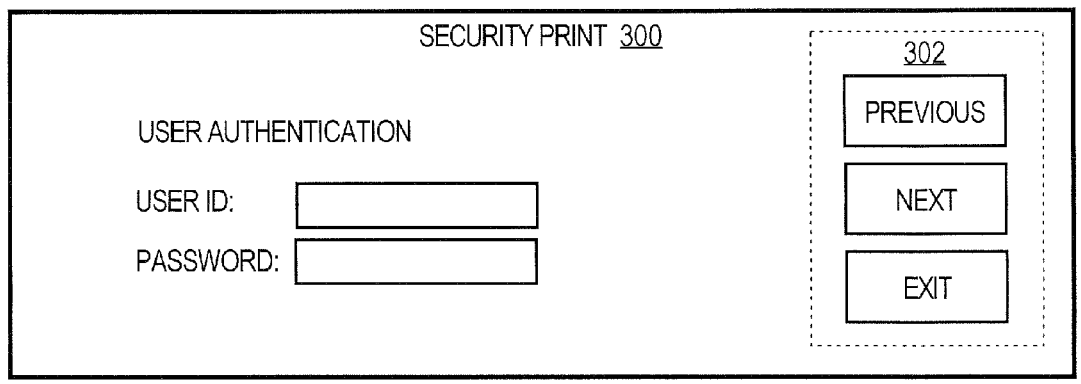
FIG. 3 is a block diagram that depicts an example security print screen displayed on an operation panel of a printing device.

FIG. 3 is a block diagram that depicts an example security print screen 300 displayed on operation panel 114. Security print screen 300 may be accessed via menu controls 302 that provide access to different functions of printing device 104. For example, a user may select a "security print" option on printing device 104 to access security print screen 300. Security print screen 300 includes fields in which a user can enter a user identification (ID) and a password. Note that both a user ID and password are not necessary. For example, in situations where there is no need to differentiate between different users, only a password is requested. This may occur, for example, when a single user is using printing device 104 or when multiple users share printing device 104.

Figure 4A:
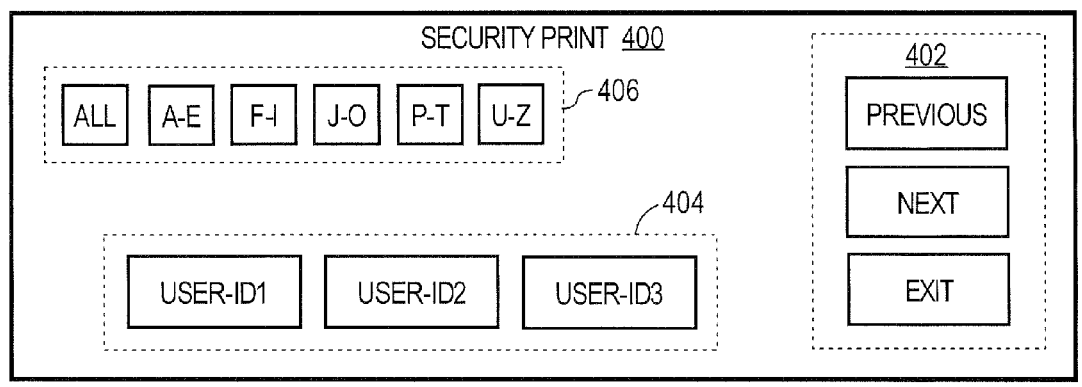
FIG. 4A is a block diagram that depicts another example security print screen displayed on an operation panel of a printing device, according to an embodiment.
Figure 4B:
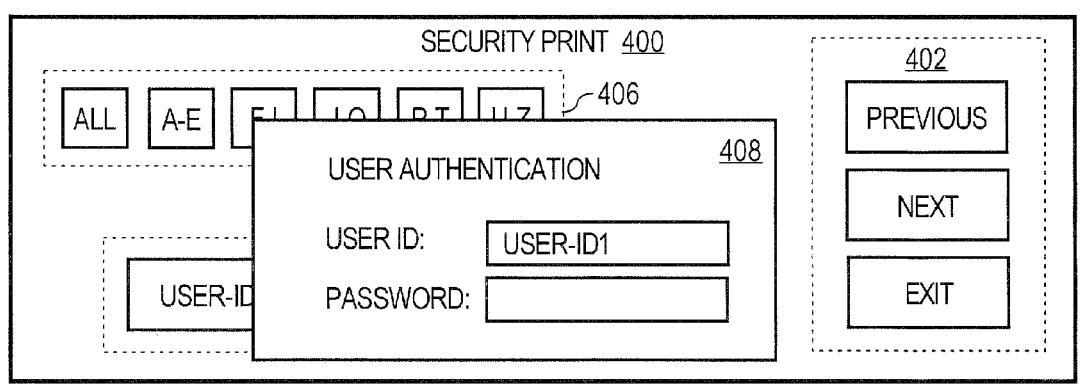
FIG. 4B is a block diagram that depicts a user authentication dialog box according to an embodiment.

FIG. 4A is a block diagram that depicts another example security print screen 400 displayed on operation panel 114. Security print screen 400 includes fields 404 that correspond to specified user IDs. Printing device 104 may be configured with the user IDs displayed in fields 404 and the user IDs may correspond, for example, to known users of printing device 104. This allows a user to simply select their user ID from security print screen 400, for example, by touching operation panel 114. The particular user IDs included in fields 404 may be determined in response to a user selecting a particular range of user IDs from a set of available user ID ranges 406. For example, if a user selects "ALL" user IDs from the set of available user ID ranges 406, then all user IDs are displayed in fields 404. If a user selects the "A-E" user ID range, then all user IDs beginning with the letters A-E are displayed in fields 404. In response to selecting a particular user ID from fields 404, a user authentication dialog box 408 is displayed as depicted in FIG. 4B. The user authentication dialog box 408 is pre-populated with the selected user ID, which in this example is USER-ID1. The user then enters a password. The user ID and password entered by the user are compared to the user ID and original password obtained from portable media 112. If they match, then the user is successfully authenticated.

D. Secure Direct Printing

Once a user has been successfully authenticated, the user is given access to one or more electronic documents. For example, a list of electronic documents may be presented to the user via operation panel 114. The user may also be given options for performing actions on any of the electronic documents, such as print and delete. The use of both a user ID and password facilitates selectively controlling access to electronic documents in situations where it is desirable to control access to particular electronic documents. For example, portable media 112 may provide to printing device 104 encrypted print data 200 for a set of electronic documents, of which a first subset of electronic documents is associated with a first user and a second subset of electronic documents is associated with a second user. The use of separate user IDs for the first and second users allows selective access to each subset of electronic documents. Access manager 124 may manage the secure printing process.

Figure 5:
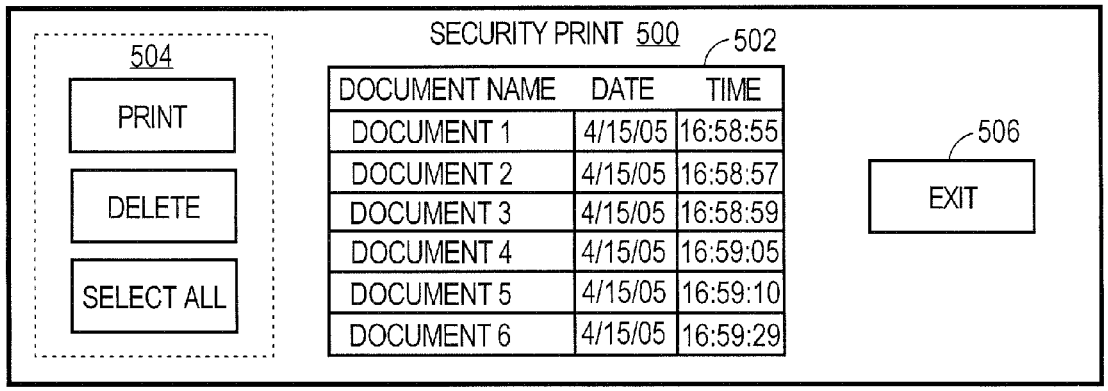
FIG. 5 is a block diagram that depicts an example security print screen that may be displayed on an operation panel of a printing device after a user has been authenticated.

FIG. 5 is a block diagram that depicts an example security print screen 500 that may be displayed on operation panel 114 after a user has been authenticated. Security print screen 500 includes a list 502 of electronic documents that the user is authorized to access. The list 502 identifies one or more documents that the user is authorized to access and may also specify one or more attributes about each electronic document. In the example depicted in FIG. 5, list 502 specifies a date and time that each electronic document was created. Other attributes may be used, depending upon a particular implementation.

The particular electronic documents that the user is authorized to access may be determined using several different approaches. For example, data may be included on portable media 112 that indicates which electronic documents are associated with a particular user ID. As another example, encrypted print data 200 may include data that indicates a user ID, so that particular electronic documents can be associated with particular user IDs. As yet another example, data may be made available to printing device 104 that indicates types or classes of documents that are associated with particular user IDs. Printing device 104 may have access to policy data that indicates document attributes associated with particular user IDs to allow an authenticated user to be given access to electronic documents that have attributes that satisfy the policy data for the authenticated user. Other techniques may be used, depending upon the particular implementation.

Security print screen 500 also includes a set of user controls 504 that allow a user to perform actions on the electronic documents in list 502. For example, a user may select a particular electronic document from list 502 and then choose to print or delete the electronic document by selecting the appropriate control from user controls 504. In the example depicted in FIG. 5, user controls also include a "select all" option that allows a user to select all of the electronic documents in list 502 and then perform an operation, such as print or delete, on all of the electronic documents. Security print screen 500 also includes a user control 506 for exiting security print screen 500.

E. Operational Example

Figure 6:
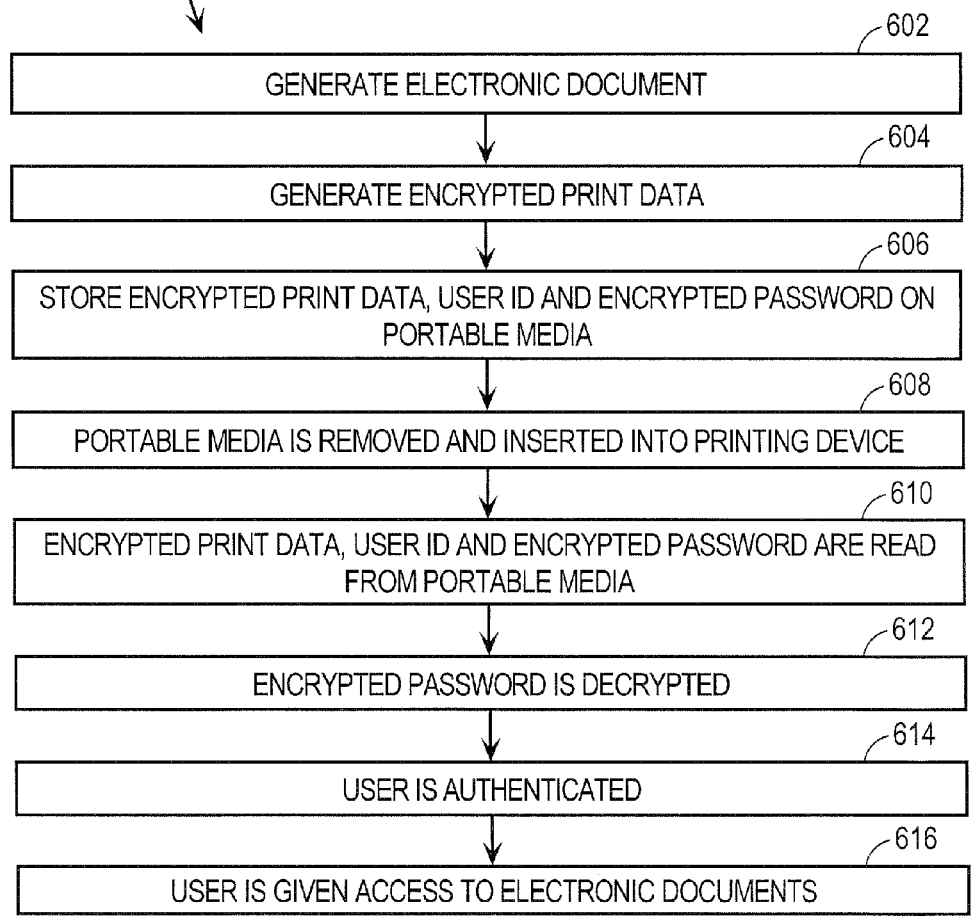
FIG. 6 is a flow diagram that depicts an approach for performing secure direct printing of electronic documents according to an embodiment.

FIG. 6 is a flow diagram 600 that depicts an approach for performing secure direct printing of electronic documents according to an embodiment. In step 602, an electronic document is generated. For example, a user may use application 106, such as a word processor, to create an electronic document.

In step 604, encrypted print data is generated. For example, a user may select a security print option in application 106, instead of a conventional print option, to print an electronic document that the user has created. Application 106 processes the electronic document and generates print data, for example in Page Description Language (PDL). The print data is then encrypted using a password by either application 106 or encryption process 108. The password may be made available to application 106 or encryption process 108 from local storage, or the password may be queried from a user.

In step 606, the encrypted print data 200, encrypted password 202 and user ID 204 are stored on portable media 112. The user ID 204 may be obtained from the user, for example via application 106, or from another source. The password is encrypted using any standard encryption technique, such as any Public Key Cryptography Standard (PKCS).

In step 608, portable media 112 is removed from client device 102 and inserted into printing device 104. For example, portable media 112 may be removed from media interface 110 and put into media interface 116.

In step 610, printing device 104 reads the encrypted print data 200, encrypted password 202 and user ID 204 from portable media 112. For example, when portable media 112 is inserted into media interface 116, media interface 116 provides a signal to access manager 124 to indicate that portable media 112 has been inserted. Access manager 124 causes the encrypted print data 200, the encrypted password 202 and the user ID 204 to be read from portable media 112 and stored in NV storage 120, or some other location.

In step 612, the encrypted password 202 is decrypted and the original password is recovered. For example, access manager 124 may retrieve a key used to encrypt encrypted password 202. Access manager 124 uses the key to decrypt encrypted password 202 and recover the original password.

In step 614, the user is authenticated as previously described herein. For example, a user may select a "security print" option via operation panel 114 and is then queried for a password or both a user ID and password. In the situation where both a user ID and password are queried, access manager 124 compares the user ID and password entered by the user with the user ID 204 and the original password recovered from the encrypted password 202 read from portable media 112. Encrypted password 202 is not necessarily immediately decrypted upon being stored to NV storage 120. For added security, encrypted password 202 may be stored in NV storage 120 in its encrypted form and decrypted after a user selects to perform a security print and enters a password. In step 616, assuming the user is successfully authenticated, the user is given access to one or more electronic documents that the user is authorized to access, as previously described herein.

As described herein, the approach for secure direct printing of electronic documents allows electronic documents to be printed securely. Electronic documents are not printed until a user inserts portable media 112 into printing device 104 and selects secure printing. This eliminates the possibility of an unauthorized third party gaining access to a printed copy of an electronic document. Furthermore, since a user must be authenticated before printing of electronic documents from portable media 112 is allowed, a third party gaining unauthorized possession of portable media 112 will not be able to print the electronic documents. The approach described herein may be used in conjunction with conventional printing of electronic documents.

III. Secure Direct Printing of Electronic Documents with Remote User Authentication The secure direct printing approach with remote user authentication is similar to the secure direct printing approach previously described herein, except that the password used to encrypt print data is not stored on the portable media with the encrypted print data and instead is maintained at a remote entity.

A. Architecture

Figure 7:
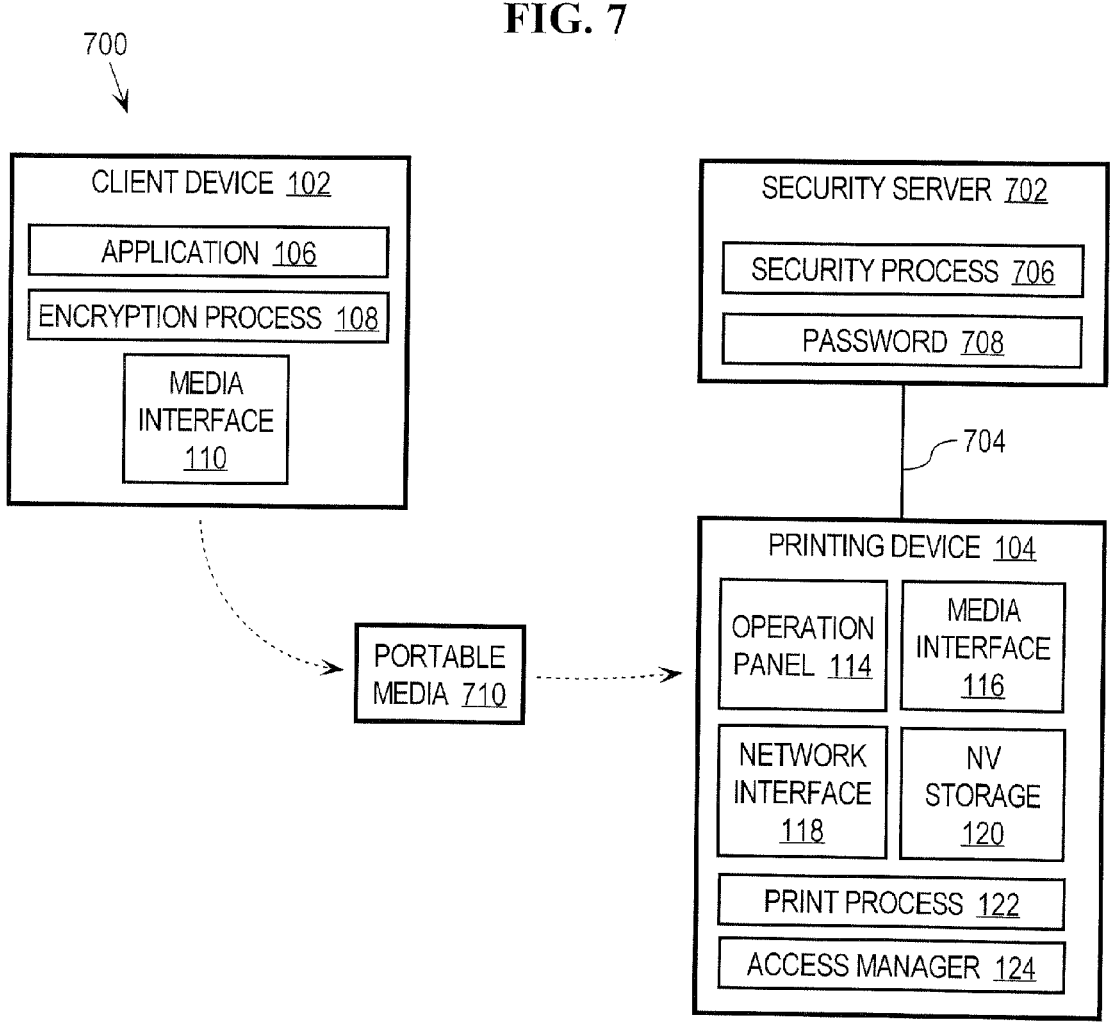
FIG. 7 is a block diagram that depicts an arrangement for secure direct printing of electronic documents with remote user authentication, according to an embodiment.

FIG. 7 is a block diagram that depicts an arrangement 700 for secure direct printing of electronic documents with remote user authentication, according to an embodiment. Arrangement 700 includes numerous elements depicted in FIG. 1 and also includes a security server 702 communicatively coupled to printing device 104 via a communications link 704. Communications link 704 may be implemented by any medium or mechanism that provides for the exchange of data between printing device 104 and security server 702. Examples of communications link 704 include, without limitation, a network such as a Local Area Network (LAN), Wide Area Network (WAN), Ethernet or the Internet, or one or more terrestrial, satellite or wireless links.

Figure 8:
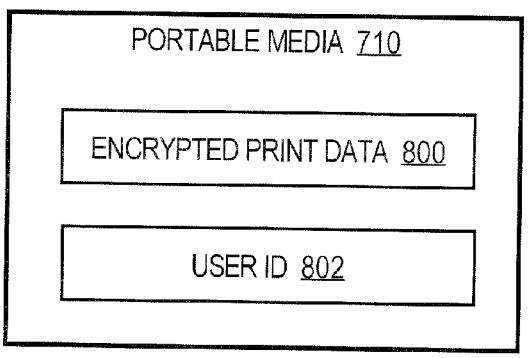
FIG. 8 is a block diagram that depicts the contents of a portable media according to an approach for secure direct printing of electronic documents with remote user authentication, according to an embodiment.

Security server 702 is a mechanism configured to manage passwords. According to one embodiment, security server 702 is configured with a security process 706 that manages access to a password 708. Security server 702 may include other elements and processes that are not depicted in FIG. 7 for purposes of explanation. For example, security server 702 may include secure interfaces and be configured to communicate with other entities using secure communications protocols. Security server 702 may also be configured to store password 708 in a secure manner. For example, security server 702 may be configured to store password 708 as encrypted data. As depicted in FIG. 8, portable media 710 includes encrypted print data 800 and a user ID 802. Unlike with the secure direct printing approach described herein, portable media 710 does not include an encrypted password. The password 708 is instead maintained on security server 702. Client device 102 and security server 702 may also be communicatively coupled to allow client device 102 to provide passwords to security server 702.

B. Functional Overview

According to the secure direct printing approach with remote user authentication, client device 102 encrypts print data to generate encrypted print data using password 708 from security server 702. Client device 102 stores the encrypted print data 800 and a user ID 802 on portable media 710. The portable media 710 is removed from client device 102 and inserted into printing device 104. Printing device 104 detects the presence of portable media 710 and retrieves the encrypted print data 800 and the user ID 802 from portable media 710. Printing device 104 authenticates a user using security server 702 and then decrypts the encrypted print data 800 to recover the original print data using password 708 from security server 702. Printing device 104 then processes the original print data to generate a printed version of the electronic document.

C. User Authentication

User authentication is not required with the secure direct printing approach with remote user authentication. This may be used when portable media are assigned to individual users and a high level of security is not required. For example, portable media 710, user ID 802 and password 708 may be assigned to a particular user. The particular user generates an electronic document, for example using application 106. The electronic document is processed and print data generated. The print data is encrypted with password 708 to generate encrypted print data 800. The encrypted print data 800 is stored on portable media 710. Portable media 710 is removed from client device 102 and installed into printing device 104.

When printing device 104 detects the presence of portable media 710, access manager 124 reads encrypted print data 800 and user ID 802 from portable media 710 and stores them on NV storage 120. Access manager 124 transmits user ID 802 to security server 702 and requests a corresponding password. Security process 706 provides password 708 to access manager 124. Access manager 124 decrypts encrypted print data 800 stored in NV storage 120 using password 708 and provides access to the electronic documents via operation panel 114. For example, as described herein, access manager 124 may present a list 502 of electronic documents and a set of user controls 504 that allow a user to perform actions on the electronic documents in list 502. This approach is simple and does not require any user authentication. This approach has relatively low security however, because the security depends upon controlling physical access to portable media 710. A third party who obtains portable media 710 has the ability to print the electronic documents contained thereon, assuming they have access to printing device 104.

Different types of user authentication may be used to provide additional security. According to one embodiment, a password is used for user authentication. According to this embodiment, printing device 104 provides user ID 802 to security server 702 and requests a corresponding password. For example, access manager 124 provides user ID 802 to security process 706 and requests a password that corresponds to user ID 802. Security process 706 provides password 708 to printing device 104. Printing device 104 queries a user for a password. The password provided by the user is compared to the password 708 retrieved from security server 702. If the two passwords match, then the user is successfully authenticated and given access to the electronic documents. This approach provides a higher level of security relatively to the prior approach with no user authentication because it requires that a user know the password 708 associated with user ID 802.

According to another embodiment, both a user ID and password are used for user authentication. According to this embodiment, a user is queried for a user identification (ID) via operation panel 114. The user ID may be data of any type, characteristic or size. Printing device 104 provides the user ID to security server 702 and requests a corresponding password. For example, access manager 124 provides the user ID entered by the user to security process 706 and requests a password. Security process 706 identifies a password that corresponds to the user ID provided by access manager 124. For example, security process 706 identifies password 708 as the password that corresponds to the user ID provided by access manager 124. If no password corresponds to the user ID provided by access manager 124, then security process 706 sends a message to access manager 124 indicating this condition. Assuming that security server 702 has a password that corresponds to the user ID provided by access manager 124, then security process 706 provides password 708 to access manager 124. The user is then queried for a password via operation panel 114. If the user ID and password provided by the user correctly match user ID 802 and password 708, then the user is successfully authenticated. Once a user has been successfully authenticated, the user is given access to one or more electronic documents, as previously described herein. This approach provides a higher level of security relatively to the prior approach with no user authentication and the prior approach that performs user authentication using only a password because it requires that a user know both the user ID 802 stored on portable media 710 and the password 708 associated with user ID 802.

Password 708 may be made available to security server 702 in a variety of ways, depending upon the requirements of a particular implementation. Passwords may be assigned to particular users. For example, security server 702 may include a table or database of passwords and corresponding user IDs. The table or database may be maintained by administrative personnel. Alternatively, client device 102 may be communicatively coupled to security server 702 and provide passwords to security process 706 for storing on security server 702.

D. Operational Example

Figure 9:
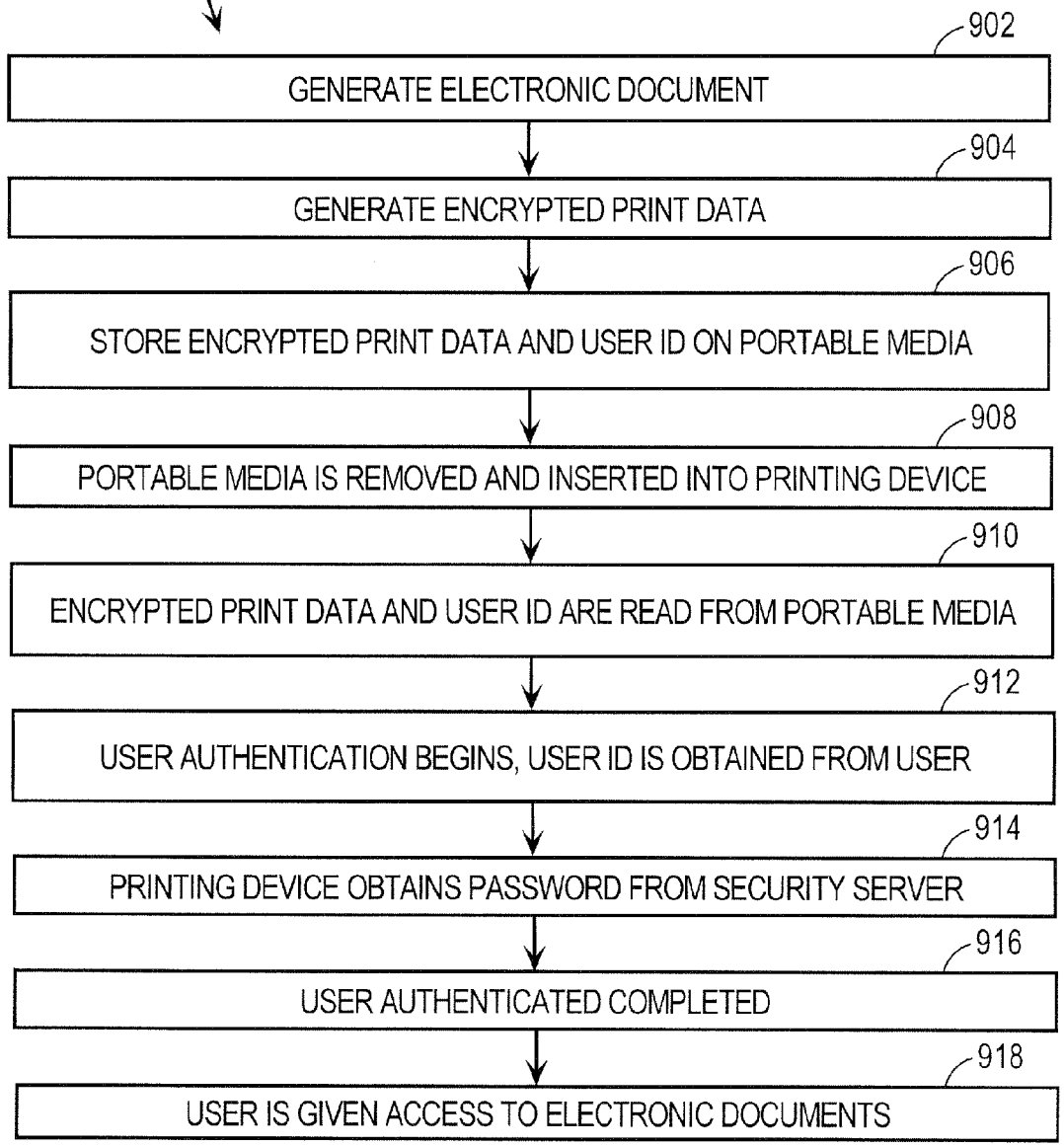
FIG. 9 is a flow diagram that depicts an approach for performing secure direct printing of electronic documents with remote authentication according to an embodiment.

FIG. 9 is a flow diagram 900 that depicts an approach for performing secure direct printing of electronic documents with remote authentication according to an embodiment. In this example, for purposes of explanation, user authentication is performed using both a user ID and password, although other types of authentication may be used as described herein. In step 902, an electronic document is generated. For example, a user may use application 106, such as a word processor, to create an electronic document.

In step 904, encrypted print data is generated. For example, a user may select a security print option in application 106, instead of a conventional print option, to print an electronic document that the user has created. Application 106 processes the electronic document and generates print data, for example in Page Description Language (PDL). The print data is then encrypted using a password by either application 106 or encryption process 108. The password may be made available to application 106 or encryption process 108 from local storage, or the password may be queried from a user.

In step 906, the encrypted print data 800 and user ID 802 are stored on portable media 710. The user ID 802 may be obtained from the user, for example via application 106, or from another source.

In step 908, portable media 710 is removed from client device 102 and inserted into printing device 104. For example, portable media 710 may be removed from media interface 110 and put into media interface 116.

In step 910, printing device 104 reads the encrypted print data 800 and user ID 802 from portable media 710. For example, when portable media 710 is inserted into media interface 116, media interface 116 provides a signal to access manager 124 to indicate that portable media 710 has been inserted. Access manager 124 causes the encrypted print data 800 and the user ID 802 to be read from portable media 710 and stored in NV storage 120, or some other location.

In step 912, user authentication begins and the user is queried for a user ID. For example, as described herein, access manager 124 causes a user to be queried for a user ID via security print screen 300, or a user selects a user ID via security print screen 400. The user ID entered by the user is compared to user ID 802 read from portable media 710. If they do not match, then the user is queried for another user ID.

In step 914, assuming the user ID entered by the user matches user ID 802, then printing device 104 obtains password 708 from security server 702 using user ID 802. For example, access manager 124 supplies user ID 802 to security process 706 and requests a corresponding password. Security process 706 identifies password 708 that is associated with user ID 802 supplied by access manager 124 and provides the identified password 708 to access manager 124. Security server 702 may maintain a table or database of passwords and data that associates the passwords with particular user IDs.

In step 916, the user authentication process is completed. The user is queried for a password, as previously described herein. The password provided by the user is compared to password 708 retrieved from security server 702. If the passwords match, then the user is successfully authenticated. If the passwords do not match, then the user may be queried for another password. In step 918, assuming the user is successfully authenticated, the user is given access to one or more electronic documents that the user is authorized to access, as previously described herein.

As described herein, the approach for secure direct printing of electronic documents with remote user authentication allows electronic documents to be printed securely. Electronic documents are not printed until a user inserts portable media 710 into printing device 104 and selects secure printing. This eliminates the possibility of an unauthorized third party gaining access to a printed copy of an electronic document. Furthermore, when user authentication is used, a third party gaining unauthorized possession of portable media 710 will not be able to print the electronic documents. The approach provides a relatively higher level of security or robustness than the secure direct printing approach previously described, since password 708 is maintained on security server 702 and is not stored on portable media 710. The approach described herein may be used in conjunction with conventional printing of electronic documents.

IV. Secure Direct Printing of Electronic Documents with Remote Data Management

The secure direct printing approach with remote data management is similar to the prior approaches described herein, except that both the password used to encrypt print data and the encrypted print data are not stored on the portable media and instead are maintained at a remote entity.

A. Architecture

Figure 10:
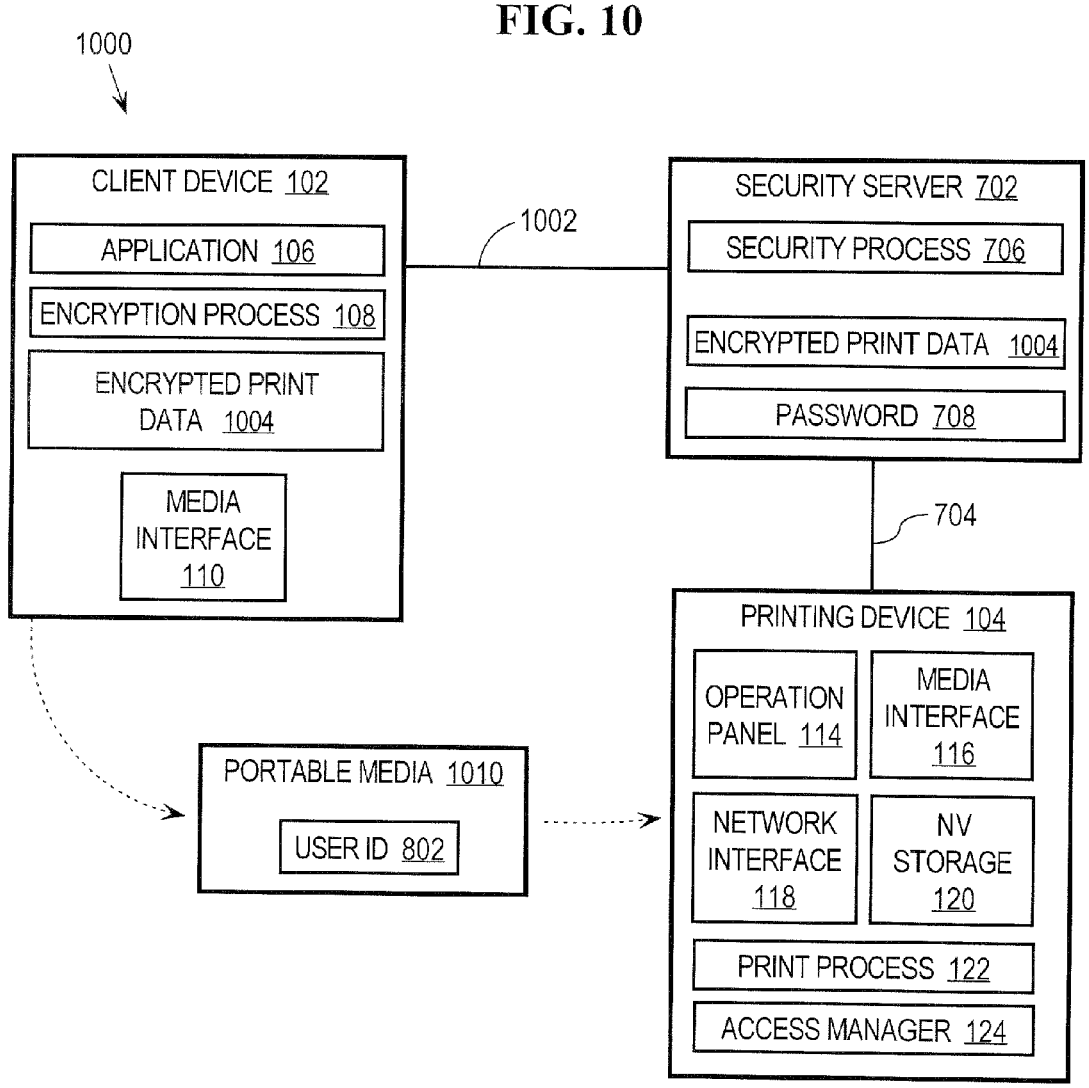
FIG. 10 is a block diagram that depicts an arrangement for secure direct printing of electronic documents with remote user authentication, according to an embodiment.

FIG. 10 is a block diagram that depicts an arrangement 1000 for secure direct printing of electronic documents with remote user authentication, according to an embodiment. Arrangement 1000 includes numerous elements depicted in FIGS. 1 and 7. In arrangement 1000, client device 102 and security server 702 are communicatively coupled via a communications link 1002. Communications link 1002 may be implemented by any medium or mechanism that provides for the exchange of data between printing device 104 and security server 702. Examples of communications link 1002 include, without limitation, a network such as a Local Area Network (LAN), Wide Area Network (WAN), Ethernet or the Internet, or one or more terrestrial, satellite or wireless links. Communications link 1002 may be a secure or unsecured communications link, depending upon a particular implementation.

B. Functional Overview

According to the secure direct printing approach with remote data management, a user generates an electronic document at client device 102, for example, using application 106. Application 106 generates print data, for example in response to a user selecting a print option from application 106. Client device 102 encrypts the print data using password 708 to generate encrypted print data 1004. Client device 102 sends the encrypted print data 1004 to security server 702 via communications link 1002. Client device 102 stores the user ID 802 on portable media 1010. The portable media 1010 is removed from client device 102 and inserted into printing device 104. Printing device 104 detects the presence of portable media 1010 and retrieves the user ID 802 from portable media 1010. Printing device 104 authenticates a user using security server 702 and then decrypts the encrypted print data 1004 to recover the original print data using password 708 from security server 702. Printing device 104 then processes the original print data to generate a printed version of the electronic document.

C. User Authentication

User authentication is not required with the secure direct printing approach with remote data management. This may be used when portable media are assigned to individual users and a high level of security is not required. For example, portable media 1010, user ID 802 and password 708 may be assigned to a particular user. The particular user generates an electronic document, for example using application 106. The electronic document is processed and print data generated. The print data is encrypted with password 708 to generate encrypted print data 1004. The encrypted print data 1004 is sent to security server 702 and user ID 802 is stored on portable media 1010. Portable media 1010 is removed from client device 102 and installed into printing device 104.

When printing device 104 detects the presence of portable media 1010, access manager 124 reads user ID 802 from portable media 1010 and stores it on NV storage 120. Access manager 124 transmits user ID 802 to security server 702 and requests a corresponding password and encrypted print data. Security process 706 provides password 708 and encrypted print data 1004 to access manager 124. Access manager 124 decrypts encrypted print data 1004 stored in NV storage 120 using password 708 and provides access to the electronic documents via operation panel 114. For example, as described herein, access manager 124 may present a list 502 of electronic documents and a set of user controls 504 that allow a user to perform actions on the electronic documents in list 502. This approach is simple and does not require any user authentication. This approach has relatively low security however, because the security depends upon controlling physical access to portable media 1010. A third party who obtains portable media 1010 has the ability to print the electronic documents contained thereon, assuming they have access to printing device 104.

Different types of user authentication may be used to provide additional security. According to one embodiment, a password is used for user authentication. According to this embodiment, printing device 104 provides user ID 802 to security server 702 and requests a corresponding password. For example, access manager 124 provides user ID 802 to security process 706 and requests a password that corresponds to user ID 802. Security process 706 provides password 708 to printing device 104. Printing device 104 queries a user for a password. The password provided by the user is compared to the password 708 retrieved from security server 702. If the two passwords match, then the user is successfully authenticated. Printing device 104 then requests encrypted print data 1004 from security server 702. Printing device 104 decrypts encrypted print data 1004 and gives the user access to the electronic documents. This approach provides a higher level of security relatively to the prior approach with no user authentication because it requires that a user know the password 708 associated with user ID 802.

According to another embodiment, both a user ID and password are used for user authentication. According to this embodiment, a user is queried for a user identification (ID) via operation panel 114. Printing device 104 provides the user ID to security server 702 and requests a corresponding password. For example, access manager 124 provides the user ID entered by the user to security process 706 and requests a password. Security process 706 identifies a password that corresponds to the user ID provided by access manager 124. For example, security process 706 identifies password 708 as the password that corresponds to the user ID provided by access manager 124. If no password corresponds to the user ID provided by access manager 124, then security process 706 sends a message to access manager 124 indicating this condition. Assuming that security server 702 has a password that corresponds to the user ID provided by access manager 124, then security process 706 provides password 708 to access manager 124. The user is then queried for a password via operation panel 114. If the user ID and password provided by the user correctly match user ID 802 and password 708, then the user is successfully authenticated. Once a user has been successfully authenticated, printing device requests encrypted print data that corresponds to user ID 802. Security server 702 provides encrypted print data 1004 to printing device 104. Printing device 104 decrypts the encrypted print data 1004 using password 708 to recover the original print data. Printing device 104 then given the user access to one or more electronic documents, as previously described herein. This approach provides a higher level of security relatively to the prior approach with no user authentication and the prior approach that performs user authentication using only a password because it requires that a user know both the user ID 802 stored on portable media 1010 and the password 708 associated with user ID 802 that is stored on security server 702.

Password 708 may be made available to security server 702 in a variety of ways, depending upon the requirements of a particular implementation. Passwords may be assigned to particular users. For example, security server 702 may include a table or database of passwords and corresponding user IDs. The table or database may be maintained by administrative personnel. Alternatively, client device 102 and security server 702 may securely exchange password 708. As another example, so called "out of band" approaches may be used provide password 708 to security server 702.

D. Operational Example

Figure 11:
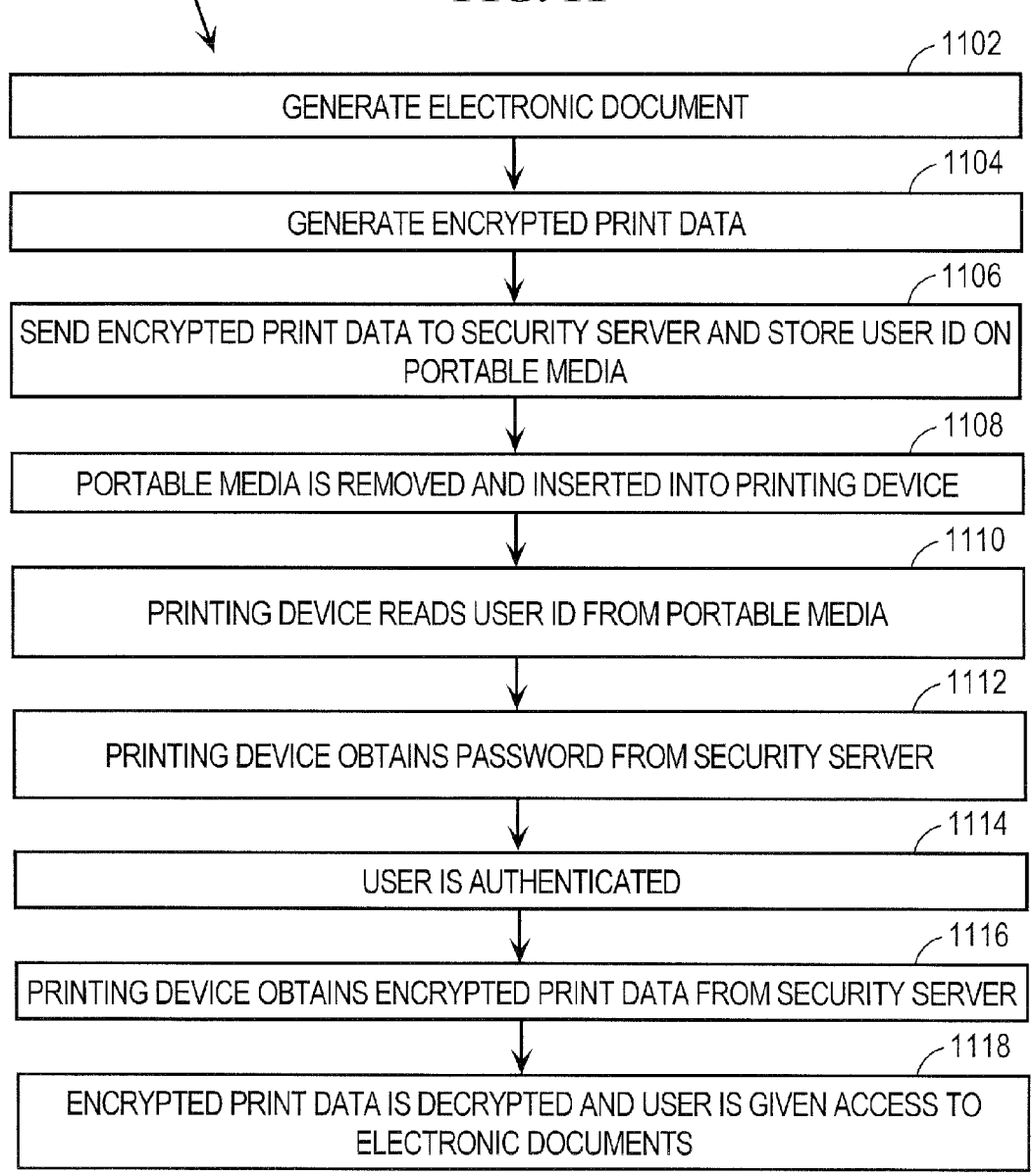
FIG. 11 is a flow diagram that depicts an approach for performing secure direct printing of electronic documents with remote data management according to an embodiment.

FIG. 11 is a flow diagram 1100 that depicts an approach for performing secure direct printing of electronic documents with remote data management according to an embodiment. In this example, for purposes of explanation, user authentication is performed using both a user ID and password, although other types of authentication may be used as described herein. In step 1102, an electronic document is generated. For example, a user may use application 106, such as a word processor, to create an electronic document.

In step 1104, encrypted print data is generated. For example, a user may select a security print option in application 106, instead of a conventional print option, to print an electronic document that the user has created. Application 106 processes the electronic document and generates print data, for example in Page Description Language (PDL). The print data is then encrypted using a password by either application 106 or encryption process 108. The password may be made available to application 106 or encryption process 108 from local storage, or the password may be queried from a user.

In step 1106, the encrypted print data 1004 is provided to security server 702 and user ID 802 is stored on portable media 1010. The user ID 802 may be obtained from the user, for example via application 106, or from another source.

In step 1108, portable media 1010 is removed from client device 102 and inserted into printing device 104. For example, portable media 1010 may be removed from media interface 110 and put into media interface 116.

In step 1110, printing device 104 reads the user ID 802 from portable media 1010. For example, when portable media 1010 is inserted into media interface 116, media interface 116 provides a signal to access manager 124 to indicate that portable media 1010 has been inserted. Access manager 124 causes the user ID 802 to be read from portable media 1010 and stored in NV storage 120, or some other location.

In step 1112, printing device 104 obtains password 708 from security server 702. For example, access manager 124 provides user ID 802 to security process 706 and requests the password that corresponds to user ID 802. Security process 706 provides password 708 to access manager 124.

In step 1114, the user is authenticated. For example, as described herein, access manager 124 causes a user to be queried for a user ID via security print screen 300, or a user selects a user ID via security print screen 400. The user ID entered by the user is compared to user ID 802 read from portable media 1010. If they do not match, then the user is queried for another user ID. Assuming the user ID entered by the user matches user ID 802, then the user is queried for a password. If the password entered by the user matches password 708 from security server 702, then the user is successfully authenticated. Note that the user may instead be queried for both a user ID and password and then the comparison against user ID 802 and password 708 performed.

Assuming that the user has been successfully authenticated, then in step 1116, printing device requests encrypted print data associated with user ID 802. For example, access manager 124 sends user ID to security process 706 and requests encrypted print data that corresponds to user ID 802. Security process 706 sends encrypted print data 1004 to access manager 124.

In step 1118, printing device 104 decrypts encrypted print data 1004 using password 708 and then provides user access to the electronic documents, as previously described herein.

As described herein, the approach for secure direct printing of electronic documents with remote data management allows electronic documents to be printed securely. Electronic documents are not printed until a user inserts portable media 1010 into printing device 104 and selects secure printing. This eliminates the possibility of an unauthorized third party gaining access to a printed copy of an electronic document. Furthermore, when user authentication is used, a third party gaining unauthorized possession of portable media 1010 will not be able to print the electronic documents. The approach provides a relatively higher level of security or robustness than the secure direct printing or secure direct printing with remote authentication approaches previously described, since password 708 and encrypted print data 1004 are maintained on security server 702 and are not stored on portable media 1010. The approach described herein may be used in conjunction with conventional printing of electronic documents.

V. Implementation Mechanisms

The approach described herein for securely deploying network devices provides the benefit that a user does not need to be aware of any details of configuring a network device, such as particular configuration parameters or policies. Also, a user does not need to schedule the configuration of a network device, because the approach allows this to be done automatically by services 120. The use of separate secure management and secure data connections provides great flexibility in managing any number of network devices with minimal intrusion to the secure data connection.

Figure 12:
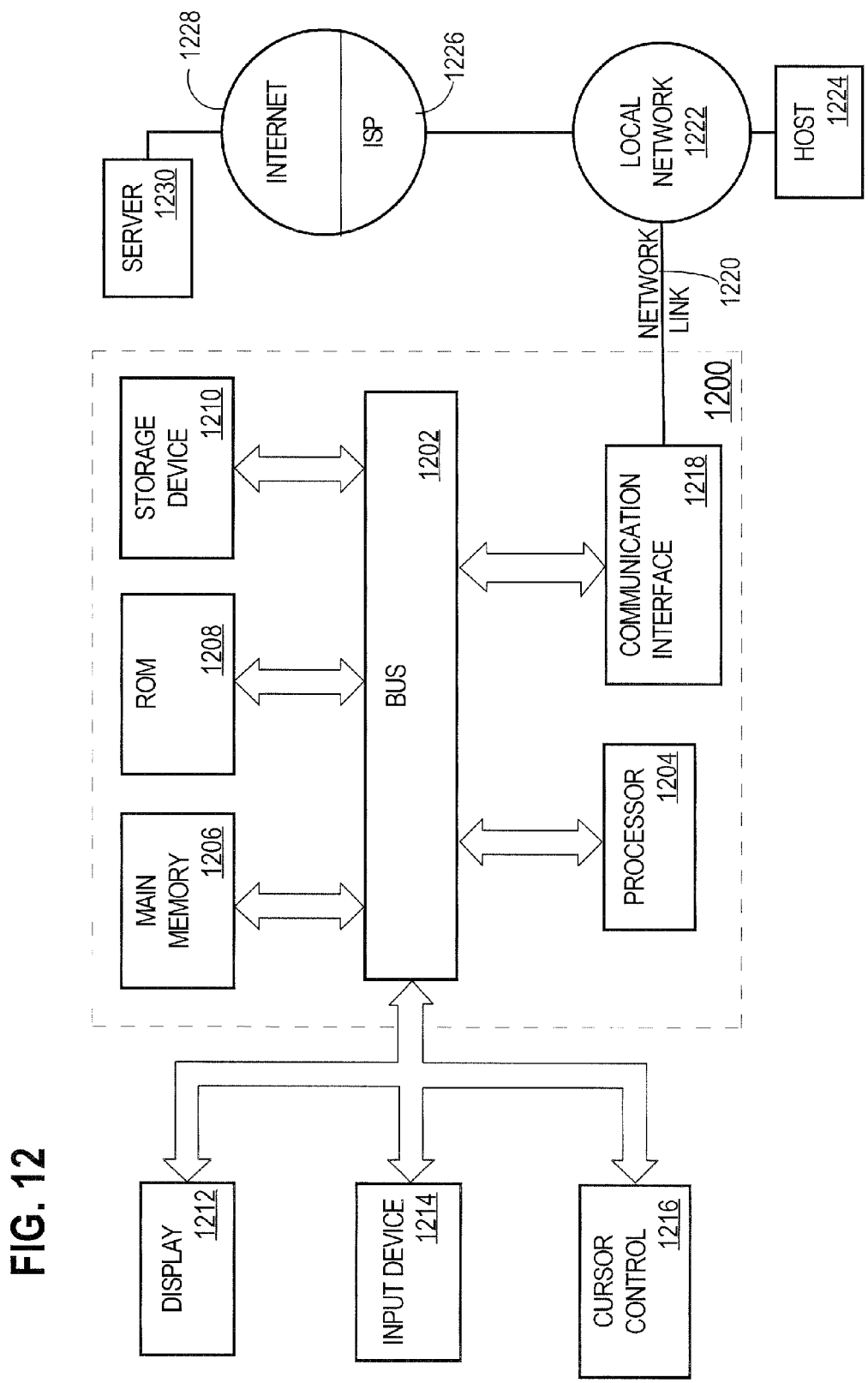
FIG. 12 is a block diagram of a computer system on which embodiments of the invention may be implemented.

The approach described herein may be implemented in hardware, computer software or any combination of hardware and computer software on any type of computing platform. FIG. 12 is a block diagram that illustrates an example computer system 1200 upon which an embodiment may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific fashion. In an embodiment implemented using computer system 1200, various computer-readable media are involved, for example, in providing instructions to processor 1204 for execution. Such a medium may take many forms, including but not limited to, non-volatile media and volatile media. Non-volatile media includes, for example, optical or magnetic disks, such as storage device 1210. Volatile media includes dynamic memory, such as main memory 1206.

Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
    a print process configured to cause an electronic document to be printed; and
    wherein the printing device is configured to:
        transmit user information over a network to a server that stores a plurality of encrypted print data,
        receive, from the server over the network, password data that corresponds to the user information,
        receive password data via a user interface of the printing device,
        determine whether the password data received via the user interface of the printing device matches the password data received from the server,
        in response to determining that the password data received via the user interface of the printing device matches the password data received from the server, request, from the server, encrypted print data that corresponds to the user information,
        receive, from the server, the encrypted print data that corresponds to the user information, and
        decrypt the encrypted print data received from the server using the password data received from the server.

2. The printing device as recited in claim 1, further comprising:
    a media interface; and
    wherein the printing device is further configured to:
        detect that a portable media is in communication with the media interface of the printing device,
        retrieve, from the portable media, the user information, and provide the user information to the server over a network.

3. The printing device as recited in claim 2, wherein the user information includes at least a user identification.

4. The printing device as recited in claim 1, wherein the user information includes at least a user identification and a password.

5. The printing device as recited in claim 1,
    wherein the printing device is further configured to:
        receive, from the server over the network, data that identifies one or more encrypted print data stored on the server that correspond to the user information,
        detect, via the user interface of the printing device, user selection of particular data from the data that identifies one or more encrypted print data stored on the server that corresponds to the user information, wherein the particular data corresponds to the encrypted print data, and
        provide, to the server, the particular data that corresponds to the encrypted print data.

6. The printing device as recited in claim 1,
    wherein the printing device is further configured to query a user for the user information via the user interface of the printing device.

7. A non-transitory computer-readable medium storing instructions which, when processed by one or more processors, causes:
    a printing device to:
        transmit user information over a network to a server that stores a plurality of encrypted print data,
        receive, from the server over the network, password data that corresponds to the user information,
        receive password data via a user interface of the printing device,
        determine whether the password data received via the user interface of the printing device matches the password data received from the server,
        in response to determining that the password data received via the user interface of the printing device matches the password data received from the server, request, from the server, encrypted print data that corresponds to the user information,
        receive, from the server, the encrypted print data that corresponds to the user information, and
        decrypt the encrypted print data received from the server using the password data received from the server.

8. The non-transitory computer-readable medium as recited in claim 7, further comprising additional instructions which, when processed by the one or more processors, causes:
    the printing device to:
        detect that a portable media is in communication with a media interface of the printing device,
        retrieve, from the portable media, the user information, and
        provide the user information to the server over a network.

9. The non-transitory computer-readable medium as recited in claim 8, wherein the user information includes at least a user identification.

10. The non-transitory computer-readable medium as recited in claim 7, wherein the user information includes at least a user identification and a password.

11. The non-transitory computer-readable medium as recited in claim 7, further comprising additional instructions which, when processed by the one or more processors, causes:
    the printing device to:
    receive, from the server over the network, data that identifies one or more encrypted print data stored on the server that correspond to the user information,
    detect, via the user interface of the printing device, user selection of particular data from the data that identifies one or more encrypted print data stored on the server that corresponds to the user information, wherein the particular data corresponds to the encrypted print data, and
    provide, to the server, the particular data that corresponds to the encrypted print data.

12. The non-transitory computer-readable medium as recited in claim 7, further comprising additional instructions which, when processed by the one or more processors, causes the printing device to query a user for the user information via the user interface of the printing device.

13. A method comprising:
   a printing device:
   transmitting user information over a network to a server that stores a plurality of encrypted print data,
   receiving, from the server over the network, password data that corresponds to the user information,
   receiving password data via a user interface of the printing device,
   determining whether the password data received via the user interface of the printing device matches the password data received from the server,
   in response to determining that the password data received via the user interface of the printing device matches the password data received from the server,
   requesting, from the server, encrypted print data that corresponds to the user information,
   receiving, from the server, the encrypted print data that corresponds to the user information, and
   decrypting the encrypted print data received from the server using the password data received from the server.

14. The method as recited in claim 13, further comprising: the printing device:
   detecting that a portable media is in communication with a media interface of the printing device,
   retrieving, from the portable media, the user information, and
   providing the user information to the server over a network.

15. The method as recited in claim 14, wherein the user information includes at least a user identification.

16. The method as recited in claim 13, wherein the user information includes at least a user identification and a password.

17. The method as recited in claim 13, further comprising: the printing device:
   receiving, from the server over the network, data that identifies one or more encrypted print data stored on the server that correspond to the user information,
   detecting, via the user interface of the printing device, user selection of particular data from the data that identifies one or more encrypted print data stored on the server that corresponds to the user information, wherein the particular data corresponds to the encrypted print data, and
   providing, to the server, the particular data that corresponds to the encrypted print data.

18. The method as recited in claim 13, further comprising: the printing device querying a user for the user information via the user interface of the printing device.

* * * * *